J. M. & P. J. COCO.
BOLL WEEVIL TRAP.
APPLICATION FILED AUG. 14, 1908.

926,244.

Patented June 29, 1909.

WITNESSES:
L. A. Voorhies
F. E. Bordelon

INVENTORS.
Paulen J. Coco
Joseph M. Coco.
BY N. R. Andrews,
ATTORNEY.

UNITED STATES PATENT OFFICE.

JOSEPH MILTON COCO AND PAULEN JOSEPH COCO, OF VOORHIES, LOUISIANA.

BOLL-WEEVIL TRAP.

No. 926,244.  Specification of Letters Patent.  Patented June 29, 1909.

Application filed August 14, 1908. Serial No. 448,617.

*To all whom it may concern:*

Be it known that we, JOSEPH MILTON COCO and PAULEN JOSEPH COCO, citizens of the United States of America, residing at Voorhies, in the parish of Avoyelles and State of Louisiana, have invented certain new and useful Improvements in Boll-Weevil Traps, of which the following is a specification, reference being had therein to the accompanying drawing.

Our invention relates to an improvement in boll weevil traps.

Our object is to produce a device of simple and cheap construction, which will effectually dislodge the insects from the plants without damaging the plants, and which will catch and hold the insects when thus dislodged.

Figure 1:
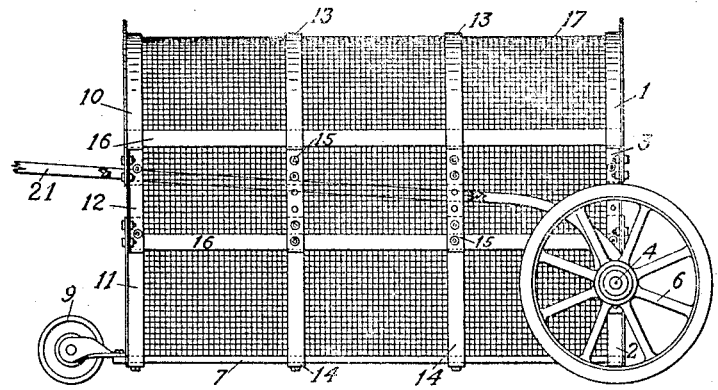
Figure 4:
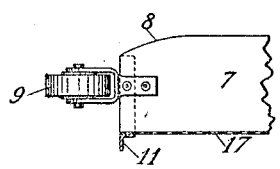
Figure 2:
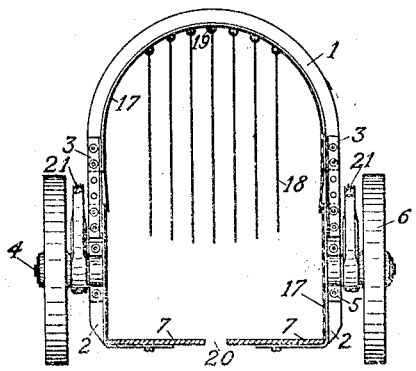
Figure 3:
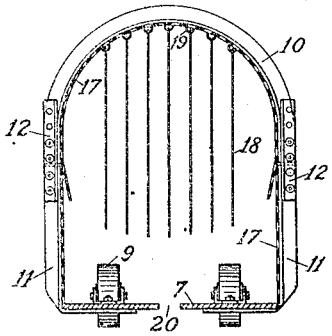

In the accompanying drawing, Figure 1 is a side elevation of our improvement, with the tree on the near side partly broken away for the sake of clearness. Fig. 2 is a vertical section taken in front of the rear wheels of the device. Fig. 3 is a vertical section taken near the front end of our trap; and Fig. 4 is a plan view of the front end of one of the base boards with its guide wheel attached to the front end thereof.

The numeral 1 indicates the upper section of the rear end portion of the frame, and the numerals 2—2 the lower sections of said portion. The section 1 is curved or arched, and the sections 2—2 are bent inwardly toward each other at their lower ends, to form supports for the base boards 7—7 of the device. The section 1 and the vertical portions of the sections 2—2 are preferably angular in cross section. The sections 10 and 11—11 at the front end of the frame, correspond respectively in construction and shape, to the sections 1 and 2—2 at the rear end.

Between the front and rear ends of our device are two intermediate frame portions, each having an upper curved section 13, and lower sections 14—14. These intermediate portions of the frame are similar to the front and rear portions thereof, except that they are formed of flat iron.

The mating upper and lower sections referred to are all provided at their meeting ends with apertures, to adapt them to be connected together by fish plates, in order that the top or overarching portion of the device may be brought nearer to or farther from the base boards 7—7, as the size of the cotton to be operated upon may require. The front fish plates 12—12 and the rear plates 3—3 may be formed of angle iron if preferred, while the intermediate plates 15—15 are preferably formed of flat iron.

The front and rear and intermediate portions of the device are all connected together by the longitudinal braces 16—16, which arrangement gives rigidity to the frame.

Stub axles 4—4 are suitably held upon the rear sections 2—2 of the frame, by means of the supports 5—5, rigidly connected thereto. Mounted upon these axles are the main wheels 6—6 of the device.

Our device is provided at its sides and top with screening material, preferably formed of perforated metal, and made in upper and lower sections, secured respectively to the upper and lower sections of the frame. As clearly shown in Fig. 3, the upper section of screening material is free at its lower sides, projecting down and overlapping the lower sections, in order that it may not interfere with the adjustment of said sections to or from each other.

The base boards 7—7 are supported in a horizontal position upon the inwardly bent ends of the lower sections of the frame. The inner edges of these boards are separated from each other by a space 20, and at their front ends are rounded or curved outwardly as illustrated in Fig. 4, to form an easy guide opening, or mouth, for the reception of the cotton plants into said space 20. The small guide wheels 9—9 are journaled in frames suitably secured to the front ends of the base boards 7—7.

The hangers 18 loosely depend from the hooks or swivels 19 at the upper portion of the frame of the device, which arrangement permits a free movement of the hangers in every direction.

The device is provided with two driving trees 21—21 one at each side of the trap—, and one horse is to be attached to each tree.

When desired, a seat for the driver may be attached to the frame, but this has been omitted from the drawings for the sake of clearness.

In practice our trap is drawn by horses or mules along the rows of cotton, with the cotton plants passing successively into the space 20 between the boards 7—7, which are coated with any desired plastic material, but preferably with pine tar. As the trap advances the hangers 18 strike the foliage of the plant and dislodge the insects, many of which fall directly upon the tarred boards 7—7, while those attempting to escape by flight, strike the screen and also fall down into the tar. At suitable intervals the tar and insects are scraped from the boards and burned, and the boards are recoated for another catch.

Having thus described our invention, we do not wish to be limited to the exact showing made, but desire protection on all that comes within the spirit and scope of our invention.

What we claim as new and desire to secure by Letters Patent is:—

1. In a boll weevil trap, a frame having a plurality of upwardly extending portions each comprising a top section and side sections and fish plates for adjustably connecting said top sections with their respective side sections; an upper section of reticulated material carried by the upper sections of the frame, and side sections of similar material carried by the side sections of the frame, said top section of reticulated material being free at its lower edges, and extending downwardly to overlap the side sections; longitudinal braces connecting the upwardly extending portions of the frame; receptacles spaced from each other at the bottom of the frame, for catching the insects; hangers loosely suspended in the trap above said receptacles; and wheels for supporting the trap.

2. In a boll weevil trap, a frame formed in upper and lower parts; means for adjusting said parts to or from each other; an upper section of reticulated material carried by the upper part of the frame; and lower sections of similar material carried by the lower part of the frame, the screening material in one part of said frame having free projecting portions adapted to overlap the screening material in the other part of the frame, at the point of meeting of said upper and lower parts.

In testimony whereof we affix our signatures in presence of two witnesses.

JOSEPH MILTON COCO.
PAULEN JOSEPH COCO.

Witnesses:
  ANDREW HERO,
  A. S. HERO.